Patented Aug. 4, 1936

2,050,193

UNITED STATES PATENT OFFICE 2,050,193

PIGMENT COMPOSITION AND PREPARATION THEREOF

Charles R. Park, Silver Lake, Ohio, assignor to Wingfoot Corporation, Wilmington, Del., a corporation of Delaware No Drawing. Application March 7, 1932, Serial No. 597,409

5 Claims. (Cl. 134—58)

My invention relates to the treatment of solid materials to make them more readily dispersible; more particularly, to the treatment of finely divided solid materials such, for example, as those used in the compounding of rubber. One of its objects is to provide a material having an improved dispersibility in media such as rubber. A further object is to provide a novel method of preparing readily dispersible materials. Still other objects of the invention will be apparent from the succeeding description.

For purposes of illustration, the invention will be explained as applied to the preparation of pigments and other solids used in rubber, although it will be understood that it is not limited thereto.

With the development and use of more efficient processes and apparatus in the manufacture of articles of rubber, it has become highly desirable to reduce the time employed in incorporating the various pigments used in the stock. In certain cases, it has not been possible to do so; in the majority, it has been found that a reduction can be accomplished, but at a sacrifice of quality. Moreover, if the speed of mixing is increased, especially when the mixing is performed in internal mixers, the higher temperatures occasioned often cause "scorching" of the rubber.

My invention is predicated upon the discovery that by first exposing the finely divided solid materials to be employed to the action of vapors of oily materials compatible with rubber, the materials may, upon incorporation in the rubber, be dispersed with much greater ease. The invention may be carried out with any finely divided solid materials, examples, in the case of rubber, being zinc oxide, titanium oxide, carbon black, lithopone, barytes, iron oxide, channel black, thermatomic black, clay, whiting, sulphur, magnesium silicate; also organic materials such as phenyl beta naphthylamine, dibenzothiazyl disulphide, mercaptobenzothiazole, diphenylguanidine, zinc dimethyl dithiocarbamate, tetramethyl thiuram disulphides, and any other finely divided solid antioxidants and accelerators used in rubber.

It is to be understood that any of the oily materials compatible with rubber, whether solid or liquid in form at ordinary temperatures, may be used in accordance with the teachings of my invention, the selection of the desired oily material being dependent on the particular rubber product to be manufactured. Examples of suitable oily materials are vegetable oils, such as coconut oil, pine oil, pine tar oil, soya bean oil and tung oil; animal oils, such as lard and tallow; petroleum distillates; the fatty acids, both unsaturated and saturated, such as stearic, palmitic, oleic and lauric acids; paraffin and other solid hydrocarbons; resin acids such as abietic and pimaric, and heavy tar acids obtained in the destructive distillation of wood such as pyroligneous acid. In the class of fatty acids, those having between 3 and 30 carbon atoms are generally preferable.

Although various methods of subjecting the material to the action of the oil may be employed, I have found that it is possible to employ the very simple and highly efficient method of exposing the particles of the solid material directly to vapors of the oily materials. These vapors are readily adsorbed by the solid particles, presumably condensing as thin, discrete films upon the latter. They may be produced either by heating the oily materials to temperatures approaching their boiling points or by atomization of the oily materials heated to a somewhat lesser extent. It is to be understood that the term "vapors" as used hereinafter designates either the atomized form or the volatile form.

Any convenient means of bringing the solid material into intimate contact with the oily vapors may be used. A feasible method is to conduct the oily vapors into a chamber in which shallow trays containing thin layers of the solid material are disposed in such manner as to permit free circulation of the vapors. The vapors readily penetrate the thin layers of particles and are adsorbed thereon.

Another process especially adapted for atomized vapors involves directing them into the path of a moving sheet of the finely divided solid material. One method of accomplishing this is to drop the solid material into a chamber in a thin sheet toward which are directed two or more tubes through which atomized oil is forced. It is preferable, although not in all cases necessary, to heat the oils prior to atomization so as to obtain a more uniform distribution. If an oil is to be applied which is solid at ordinary room temperatures, such as stearic acid, the heating step is essential.

In one embodiment of my invention, carbon black, such as is commonly used in rubber, is treated with pine oil by conducting vapors of pine oil into a chamber in which shallow trays containing thin layers of pigment are disposed in such manner as to permit free circulation of the vapors about the pigment. The vapors readily penetrate the thin layers of pigment and are adsorbed upon the particles thereof. In place of pine oil, pine tar oil may conveniently be used, particularly that having an acid number between 40 and 45 as determined by electrometric titration. When distilled under reduced pressure; e. g. 8 to 11 mm. of mercury, such pine tar oil gives the following fractions:

|  | Per cent |
| --- | --- |
| Below 140° C | 20 |
| 140°–200° | 16 |
| 200°–240° | 20 |
| 240°–260° | 18 |
| 260°–280° | 13 |
| Above 280° | 13 |

In like manner, any other finely divided solid material may be treated with any of the other oily materials used in rubber, either as above outlined for pine oil or by exposing the material to atomized vapors. The exact process to be used will depend to some extent on the physical characteristics of the oily material. In the case of oily materials which at atmospheric pressure decompose before reaching the boiling point, it will generally be preferable to add them by atomizing as outlined above, although by heating at reduced pressures the treating can be done by simply heating the oils. Abietic acid, which at atmospheric pressure decomposes before it boils, may, for example, be vaporized by heating to 230–250 degrees C. at a reduced pressure of 15 mm. of mercury.

As a general rule, however, with oily materials such as abietic acid, palmitic acid, oleic acid and stearic acid, which decompose at atmospheric pressure before they boil, the treating may be accomplished most simply by atomizing the oils, the same having previously been heated to approximately 60–90 degrees C. It is obviously desirable to know the physical characteristics of the oily material with which the solid material is to be treated so as to obtain the vapors therefrom by the most suitable method.

I have found that these treated solid materials are especially advantageous in the compounding of rubber, their use yielding, for one thing, much quicker and better dispersions. By a better dispersion of the ingredients in the rubber the quality of the article is increased. By a quicker dispersion, the speed of incorporation, or mixing time, is reduced, thus increasing the efficiency of the operation. In the internal mixers such as the Banbury it has heretofore not been possible to mix certain highly loaded rubber compounds because of the caking and lumping of the ingredients, giving an inferior product. By my invention this disadvantage is obviated, making it possible to mix these compounds in a much shorter time with a very high degree of dispersion.

Another important advantage of my invention is that lower temperatures are required in mixing. By using these treated solid materials, the danger of scorching is almost eliminated, even in the internal type of mixers, which generally are more responsible for high temperatures in the rubber compounds mixed therein than are mixers of the open type. Still another advantage resides in the fact that my invention is applicable not only to compounding coagulated rubber, but also to compound with aqueous rubber mixtures such as rubber latex, the dispersibility of pigments in aqueous suspensions being increased by previously coating their particles with a film of an oily material.

This application is a continuation in part of my application Serial No. 363,091, filed May 14, 1929. It is intended that the patent maturing from this application shall cover, by suitable expression in the appended claims, whatever features of patentable novelty reside in the invention herein disclosed.

What I claim is:

1. A method of treating carbon black to increase its dispersibility in rubber which comprises exposing the black in dry form to the vapors of pine tar oil.

2. A method of treating carbon black to increase its dispersibility in rubber which comprises exposing the black in dry form to the vapors of pine tar oil which, when distilled under a reduced pressure of 8 to 11 mm. of mercury, gives approximately the following fractions:

|  | Per cent |
| --- | --- |
| Below 140° C | 20 |
| 140°–200° | 16 |
| 200°–240° | 20 |
| 240°–260° | 18 |
| 260°–280° | 13 |
| Above 280° | 13 |

3. As a new article of manufacture, a finely divided carbon black composition adapted for use in rubber, said carbon black having substantially uniformly adsorbed on its particles a thin film of the condensed vapors of pine tar oil.

4. As a new article of manufacture, a finely divided solid material composition adapted for use in rubber, said solid material having substantially uniformly adsorbed on its particles a thin film of the condensed vapors of pine tar oil.

5. A method of treating a finely divided solid material to increase its dispersibility in rubber which comprises exposing the said solid material in dry form to the vapors of pine tar oil.

CHARLES R. PARK.